United States Patent
Amano et al.

(10) Patent No.: US 12,294,816 B2
(45) Date of Patent: May 6, 2025

(54) PROJECTOR

(71) Applicant: SEIKO EPSON CORPORATION, Tokyo (JP)

(72) Inventors: Yutaka Amano, Matsumoto (JP); Takehiko Uehara, Chikuma (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/454,919

(22) Filed: Aug. 24, 2023

(65) Prior Publication Data

US 2024/0073380 A1 Feb. 29, 2024

(30) Foreign Application Priority Data

Aug. 24, 2022 (JP) .................................. 2022-133286

(51) Int. Cl.
*H04N 9/31* (2006.01)
*G02F 1/13* (2006.01)

(52) U.S. Cl.
CPC .......... *H04N 9/3167* (2013.01); *G02F 1/1326* (2013.01); *H04N 9/3108* (2013.01)

(58) Field of Classification Search
CPC ...... H04N 9/3167; H04N 9/3108; H04N 9/31; G03B 21/28; G03B 21/005; G02F 1/1326
USPC ......................... 348/744, 759, 766; 353/8, 20
See application file for complete search history.

(56) References Cited

U.S. PATENT DOCUMENTS 7,042,637 B2 * 5/2006 Mukawa .............. H04N 9/3167
348/766

FOREIGN PATENT DOCUMENTS

| CN | 201622432 U | 11/2010 |
| CN | 212515320 U | 2/2021 |

* cited by examiner

*Primary Examiner* — Sherrie Hsia
(74) *Attorney, Agent, or Firm* — Dority & Manning, P.A.

(57) ABSTRACT

A projector of the present disclosure includes a light source configured to emit first light, which is non-linearly polarized light, a polarization conversion unit configured to convert the first light into predetermined linearly polarized light, a light modulation device including a liquid crystal panel which modulates the predetermined linearly polarized light, and a superimposing optical system configured to superimpose the predetermined linearly polarized light on the liquid crystal panel. The polarization conversion unit includes a polarizing separator configured to separate the first light into second light and third light and a phase difference element configured to align polarization directions of the second light and the third light with the predetermined linearly polarized light. The polarizing separator includes a polarizing separation element and a reflection element, the polarizing separation element is provided in a tilted state with respect to a principal ray of the first light and separates the first light by reflecting a first linearly polarized light component in the first light toward the superimposing optical system as the second light and transmitting, as the third light, a second linearly polarized light component in the first light, and the reflection element reflects the third light made incident from the polarizing separation element toward the superimposing optical system.

18 Claims, 10 Drawing Sheets

PROJECTOR

The present application is based on, and claims priority from JP Application Serial Number 2022-133286, filed Aug. 24, 2022, the disclosure of which is hereby incorporated by reference herein in its entirety.

BACKGROUND

1. Technical Field

The present disclosure relates to a projector.

2. Related Art

There has been known a projector including one liquid crystal panel as a light modulation element, a so-called single-plate projector (see, for example, Chinese Utility Model Registration No. 201622432 (Patent Literature 1) and Chinese Utility Model Registration No. 212515320 (Patent Literature 2)). In Patent Literature 1, predetermined linearly polarized light in light made incident from a light source is made incident on the liquid crystal panel by providing a reflective polarization element as an incident-side polarization plate of the liquid crystal panel. In Patent Literature 2, an LED that emits nonpolarized light is used as a light source.

When the nonpolarized light is transmitted through the incident-side polarization plate, light in a polarization direction different from a transmission axis of the incident-side polarization plate is cut. Therefore, when the light source that emits nonpolarized light is used in the single-plate projector, light use efficiency of the light source is deteriorated.

SUMMARY

According to an aspect of the present disclosure, there is provided a projector including: a light source configured to emit first light, which is non-linearly polarized light; a polarization conversion unit configured to convert the first light made incident from the light source into predetermined linearly polarized light; a light modulation device including a liquid crystal panel which modulates the predetermined linearly polarized light converted by the polarization conversion unit; and a superimposing optical system configured to superimpose, on the liquid crystal panel, the predetermined linearly polarized light made incident from the polarization conversion unit. The polarization conversion unit includes: a polarizing separator configured to separate the first light into second light and third light based on polarized light components; and a phase difference element configured to align polarization directions of the second light and the third light, the polarizing separator includes a polarizing separation element and a reflection element, the polarizing separation element is provided in a tilted state with respect to a principal ray of the first light and separates the first light by reflecting a first linearly polarized light component in the first light toward the superimposing optical system as the second light and transmitting, as the third light, a second linearly polarized light component in a polarization direction different from a polarization direction of the first linearly polarized light component in the first light, and the reflection element reflects the third light made incident from the polarizing separation element toward the superimposing optical system.

DESCRIPTION OF EMBODIMENTS

Figure 1:
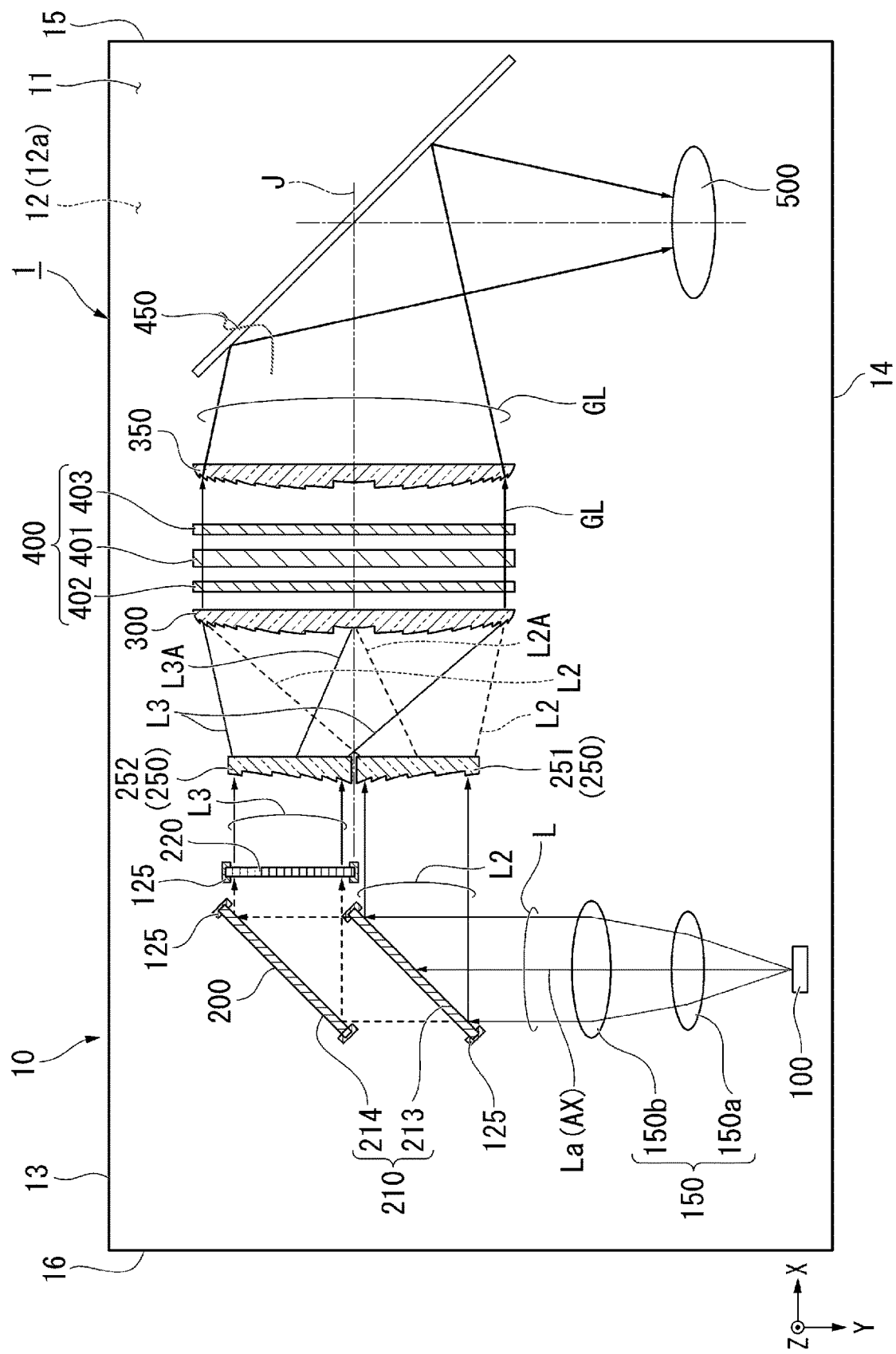
FIG. 1 is a schematic configuration diagram of a projector in a first embodiment.

Embodiments of the present disclosure are explained in detail below with reference to the drawings. In the drawings referred to in the following explanation, characteristic portions are sometimes enlarged and shown for convenience in order to clearly show characteristics, and dimension ratios and the like of components are not always the same as actual dimension ratios and the like.

First Embodiment

FIG. 1 is a schematic configuration diagram of a projector in a first embodiment.

In the drawings referred to below, scales of dimensions are sometimes differentiated and shown depending on components in order to clearly show the components.

As shown in FIG. 1, a projector 1 includes a light source 100, an optical system 150, a polarization conversion unit 200, a superimposing optical system 250, a collimating optical system 300, a condensing optical system 350, a light modulation device 400, a mirror 450, a projection optical system 500, and an exterior housing 10.

In the projector 1 in this embodiment, an axis on which a principal ray La of illumination light (first light) L emitted from the light source 100 passes is defined as an illumination optical axis AX and an axis passing the center of the light modulation device 400 and serving as a reference for disposing the components of the projector 1 is defined as a reference axis J.

In the following explanation, an XYZ orthogonal coordinate system is used for the explanation according to necessity. A Z axis is an axis extending in the up-down direction of the projector 1. An X axis is an axis parallel to the illumination optical axis AX and the reference axis J. A Y axis is an axis extending along an image projection direction of the projector 1 and is orthogonal to the X axis and the Z axis. In the following explanation, when dispositions and shapes of members in the projector 1 are explained, a direction parallel to a Z-axis direction equivalent to the height in a front view of the projector 1 viewed from an image projection side is referred to as up-down direction Z, a direction parallel to an X-axis direction equivalent to a lateral width in the front view of the projector 1 viewed from the image projection side is referred to as left-right direction X, and a direction parallel to a Y-axis direction equivalent to depth in the front view of the projector 1 viewed from the image projection side is referred to as front-rear direction Y. In some case, a +Z side, which is one side of the Z direction, is referred to as "upper side (+Z)", a −Z side, which is the other side of the Z direction, is referred to as "lower side (−Z)", a +X side, which is one side of the X direction, is referred to as "right side (+X)", a −X side, which is the other side of the X direction, is referred to as "left side (−X)", a +Y side, which is one side of the Y direction in which image light is projected, is referred to as "front side (+Y)", and a −Y side, which is the other side of the Y direction, is referred to as "rear side (−Y)". The upper side (+Z), the lower side (−Z), the front side (+Y), the rear side (−Y), the right side (+X), and the left side (−X) are only definitions for explaining a disposition relation among the components of the projector 1 and do not limit actual disposition postures and directions in the projector 1.

The light source 100 and the optical system 150 are disposed along the illumination optical axis AX.

The light source 100 emits nonlinearly polarized white light toward the rear side (−Y) as illumination light L. In this specification, nonlinearly polarized light means, for example, nonpolarized light (random polarized light), circularly polarized light, or elliptically polarized light.

In the case of this embodiment, the light source 100 is configured by, for example, a light emitting diode (LED) and emits, as the illumination light (the first light) L, nonpolarized light, that is, light in a state in which a plurality of linearly polarized lights overlap and a polarization state is not observed as a whole. It is possible to reduce the projector 1 in size and weight by using the LED as the light source 100 in this way.

The optical system 150 takes in and collimates the illumination light L emitted from the light source 100. The optical system 150 is configured by, for example, two convex lenses 150a and 150b. The number of lenses configuring the optical system 150 is not particularly limited and may be one or may be three or more.

The illumination light L collimated by the optical system 150 is made incident on the polarization conversion unit 200. The polarization conversion unit 200 converts the illumination light L made incident from the light source 100 into converted light L0, which is predetermined linearly polarized light. The polarization conversion unit 200 emits the converted light L0 toward the right side (+X). A configuration of the polarization conversion unit 200 is explained below.

The superimposing optical system 250 superimposes, on the light modulation device 400, the converted light L0 made incident from the polarization conversion unit 200. Since the superimposing optical system 250 in this embodiment has negative power, the superimposing optical system 250 can enlarge and project, on the light modulation device 400 larger than the superimposing optical system 250, light made incident from the polarization conversion unit 200.

The light modulation device 400 is a single-plate liquid crystal light modulation device including a liquid crystal panel adapted to color display. Specifically, the light modulation device 400 includes a liquid crystal panel 401 including a color filter, an incident-side polarization plate 402, and an emission-side polarization plate 403. It is possible to achieve a reduction in the size of the projector 1 by adopting the single-plate liquid crystal light modulation device in this way.

The liquid crystal panel 401 modulates, according to image information, the converted light L0 made incident from the polarization conversion unit 200 and generates image light GL. The incident-side polarization plate 402 is provided on a light incident side of the liquid crystal panel 401. The emission-side polarization plate 403 is provided on a light emission side of the liquid crystal panel 401. The incident-side polarization plate 402 and the emission-side polarization plate 403 are disposed such that polarization axes thereof are orthogonal to each other.

The collimating optical system 300 is disposed between the superimposing optical system 250 and the light modulation device 400. Specifically, the collimating optical system 300 is disposed on the light incident side of the incident-side polarization plate 402. The collimating optical system 300 collimates light made incident from the superimposing optical system 250 and makes the light incident on the light modulation device 400. In this embodiment, the collimating optical system 300 is configured by a Fresnel lens and functions as a convex lens having positive power. Therefore, the thickness in the optical axis direction of the collimating optical system 300 is reduced to reduce a dimension in the left-right direction X extending along the reference axis J of the projector 1.

The condensing optical system 350 is disposed on the light emission side of the liquid crystal panel 401. Specifically, the condensing optical system 350 is disposed on the light emission side of the emission-side polarization plate 403. The condensing optical system 350 condenses light emitted from the liquid crystal panel 401. In this embodiment, the condensing optical system 350 is configured by a Fresnel lens and functions as a convex lens having positive power. Therefore, the thickness in the optical axis direction of the condensing optical system 350 is reduced to reduce a dimension in the left-right direction X extending along the reference axis J of the projector 1.

It is possible to reduce a lens diameter of the projection optical system 500 disposed at a post stage by condensing the light emitted from the liquid crystal panel 401 with the condensing optical system 350.

The positions of the condensing optical system 350 and the emission-side polarization plate 403 may be interchanged.

The mirror 450 is disposed to form an angle of 45° with respect to the reference axis J. The mirror 450 bends, by 90°, an optical path of the image light GL emitted from the light modulation device 400 and makes the image light GL incident on the projection optical system 500. When a layout for disposing the projection optical system 500 along the reference axis J is adopted, the mirror 450 can be omitted.

The projection optical system 500 is configured by a projection lens. The projection optical system 500 projects, toward a not-shown screen, the image light GL modulated by the light modulation device 400 and made incident through the mirror 450. The number of projection lenses configuring the projection optical system 500 is not particularly limited and may be one or may be plural. A lens on the light incident side most among a plurality of lenses configuring the projection optical system 500 may be used as the condensing optical system 350.

The light source 100, the optical system 150, the polarization conversion unit 200, the superimposing optical system 250, the collimating optical system 300, the condensing optical system 350, the light modulation device 400, the mirror 450, and the projection optical system 500 are housed on the inside of the exterior housing 10.

The exterior housing 10 has a substantially rectangular parallelepiped box shape formed by a plurality of walls and configures the exterior of the projector 1. The exterior housing 10 includes a first wall 11, a second wall 12, a third wall 13, a fourth wall 14, a fifth wall 15, and a sixth wall 16.

The first wall 11 is a wall facing the upper side (+Z) in the up-down direction Z. The second wall 12 is a wall facing the lower side (−Z) in the up-down direction Z. The third wall 13 is a wall facing the rear side (−Y) in the front-rear direction Y crossing the up-down direction Z. The fourth wall 14 is a wall facing the front side (+Y) in the front-rear direction Y. The fifth wall 15 is a wall facing the right side (+X) in the left-right direction X crossing the up-down direction Z. The sixth wall 16 is a wall facing the left side (−X) in the left-right direction X. The first wall 11 and the second wall 12 are disposed at an interval in the up-down direction Z. The third wall 13 and the fourth wall 14 are disposed at an interval in the front-rear direction Y. The fifth wall 15 and the sixth wall 16 are disposed at an interval in the left-right direction X.

In this embodiment, "a certain wall of an exterior housing faces a certain direction" means that, for example, a direction of at least a half or more portion of a wall surface on the outer side of the certain wall only has to include a component facing the certain direction. For example, "the first wall 11 faces the +Z side" means that at least a part of a wall surface of the first wall 11 may be inclined to the +Z side or the entire wall surface of the first wall 11 may be orthogonal to the +Z direction.

Figure 2:
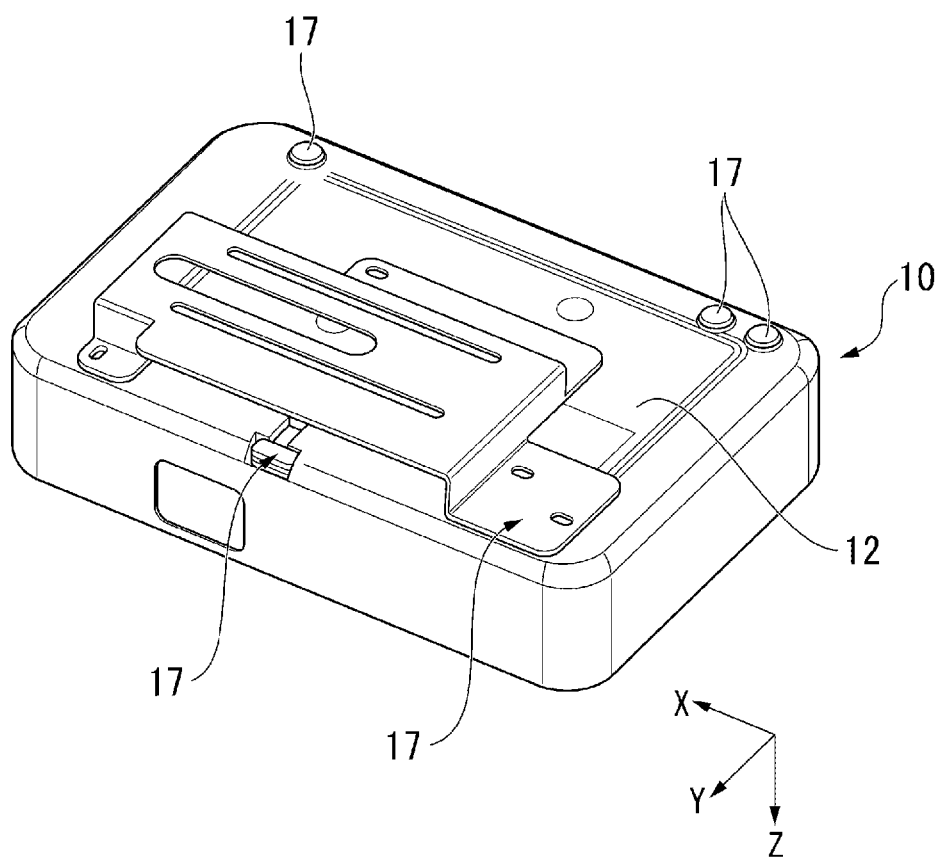
FIG. 2 is a diagram showing a main part configuration of an exterior housing.

FIG. 2 is a diagram showing a main part configuration of the exterior housing 10.

As shown in FIG. 2, components for installation 17 are provided on the second wall (a wall for installation) 12 of the exterior housing 10. The components for installation 17 are components used when the projector 1 is installed. Examples of the components for installation 17 include legs for installation that are in contact with an installation surface of a desk or the like, height adjusting mechanisms that adjust the height of the projector 1 with respect to the installation surface, and screws for attaching a tripod or fittings for suspension.

In the projector 1 in this embodiment, as shown in FIG. 1, the light source 100, the optical system 150, the polarization conversion unit 200, the superimposing optical system 250, the collimating optical system 300, the condensing optical system 350, the light modulation device 400, the mirror 450, and the projection optical system 500 are disposed along an inner surface 12a of the second wall 12. In the projector 1 in this embodiment, a direction in which the polarization conversion unit 200, the superimposing optical system 250, and the light modulation device 400 are disposed side by side in the exterior housing 10 is the left-right direction X extending along the inner surface 12a of the second wall 12.

A first direction (a −Y direction) extending along the principal ray La of the illumination light L made incident on a polarizing separator 210 and a second direction (a +Y direction) extending along a principal ray of the image light GL emitted toward the projection optical system 500 from the mirror 450 are opposite directions.

Figure 3:
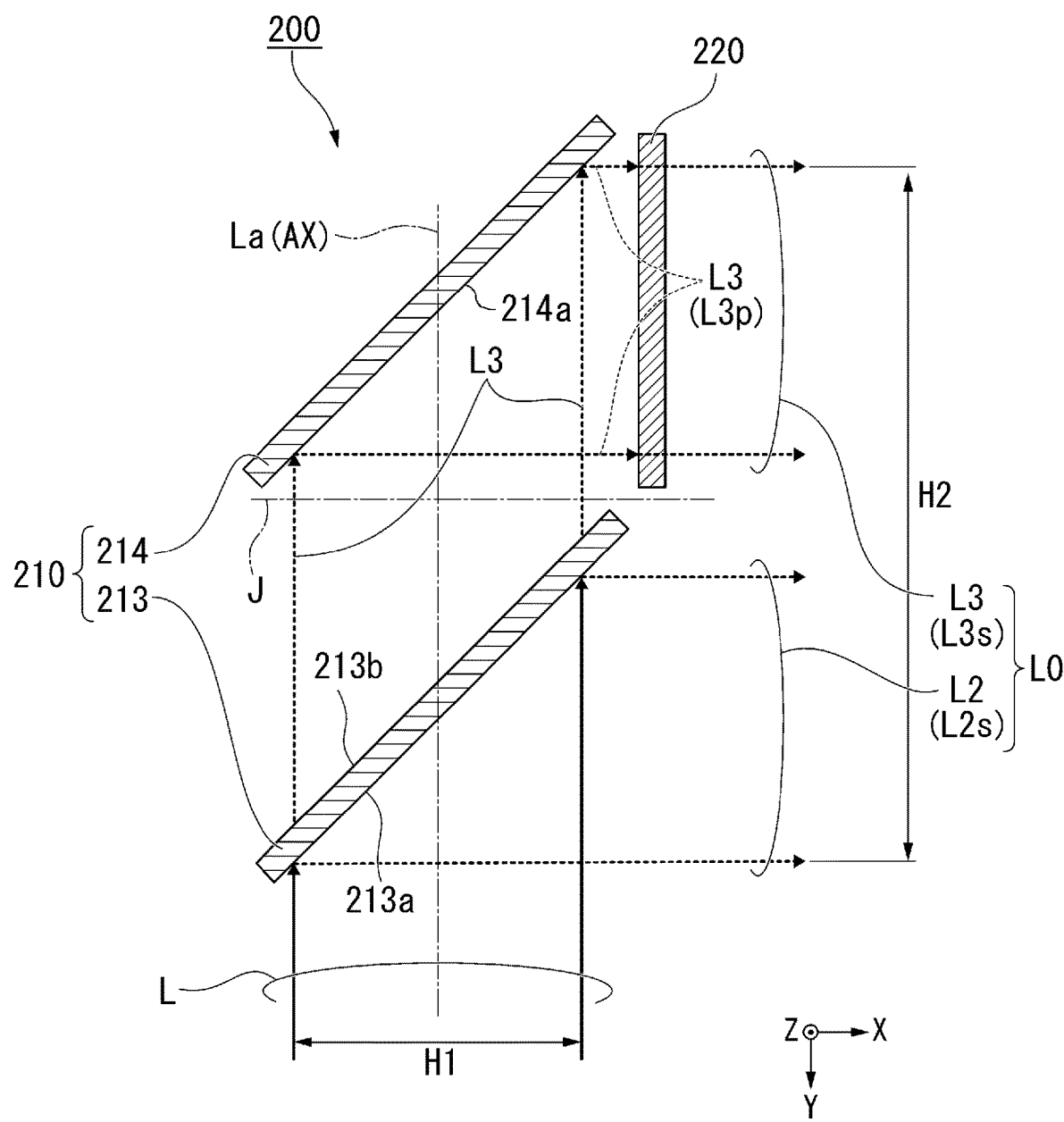
FIG. 3 is a plan view showing a main part configuration of a polarization conversion unit.

FIG. 3 is a plan view showing a main part configuration of the polarization conversion unit 200. FIG. 3 is a plan view of the polarization conversion unit 200 viewed from the upper side (+Z).

As shown in FIG. 3, the polarization conversion unit 200 includes the polarizing separator 210 and a phase difference element 220.

The polarizing separator 210 separates the illumination light L into second light L2 and third light L3 based on polarized light components. The polarizing separator 210 includes a polarizing separation element 213 and a reflection element 214 disposed to be separated from and opposed to each other.

In this embodiment, the polarizing separation element 213, the reflection element 214, and the phase difference element 220 are respectively held by plate holders 125. The plate holders 125 are fixed to the inner side of the exterior housing 10 of the projector 1. In this way, the polarizing separation element 213, the reflection element 214, and the phase difference element 220 are highly accurately disposed in predetermined positions by the plate holders 125. The plate holders 125 that hold the polarizing separation element 213, the reflection element 214, and the phase difference element 220 may be configured separately from one another or may be integrally configured.

The polarizing separation element 213 includes a light incident surface 213a and a light emission surface 213b. The light incident surface 213a is a surface on which the illumination light L emitted from the light source 100 is made incident. The light emission surface 213b is a surface parallel to and facing oppositely to the light incident surface 213a and is a surface that emits light transmitted through the polarizing separation element 213.

The polarizing separation element 213 is disposed on the rear side (−Y) of the light source 100. The polarizing separation element 213 is provided in a state in which the light incident surface 213a is tilted with respect to the principal ray La of the illumination light L. The polarizing separation element 213 is disposed such that the light incident surface 213a forms an angle of 35° to 55°, specifically, 45° with respect to the illumination optical axis AX (the principal ray La of the illumination light L). Therefore, like the light incident surface 213a, the light emission surface 213b is disposed to form an angle of 45° with respect to the illumination optical axis AX (the principal ray La of the illumination light L).

In the case of this embodiment, a reflection prevention film AR is provided on the light incident surface 213a. Consequently, since reflection of the illumination light L by the interface between the light incident surface 213a and an air layer is suppressed, the illumination light L can be efficiently made incident on the light incident surface 213a.

The polarizing separation element 213 has a polarizing separation function for the illumination light L, which is nonpolarized light. That is, the polarizing separation element 213 mainly reflects an S-polarized light component on the surface of the light incident surface 213a and mainly transmits a P-polarized light component on the surface of the light incident surface 213a among polarized light components included in the nonpolarized illumination light L. The polarizing separation element 213 in this embodiment is configured by, for example, forming a dielectric multilayer film on a transmissive substrate such as glass. That is, in this embodiment, the polarizing separation element 213 has a plate shape.

The polarizing separation element 213 reflects an S-polarized light component (a first linearly polarized light component) L2s in the illumination light L toward the superimposing optical system 250 as the second light L2 and transmits a P-polarized light component (a second linearly polarized light component) L3p in a polarization direction different from a polarization direction of the S-polarized light component in the nonpolarized illumination light L to the rear side (−Y) as the third light L3.

In this way, the polarizing separation element 213 separates the illumination light L into the second light L2 and the third light L3.

The reflection element 214 is disposed with a gap on the rear side (−Y) of the polarizing separation element 213. The reflection element 214 includes a light reflection surface 214a parallel to the light emission surface 213b of the polarizing separation element 213. The reflection element 214 is disposed such that the light reflection surface 214a forms an angle of 45° with respect to the illumination optical axis AX (the principal ray La of the illumination light L).

The reflection element 214 in this embodiment is configured by, for example, a metal mirror obtained by forming a metal film on a substrate surface. The reflection element 214 reflects the third light L3 made incident from the polarizing separation element 213 toward the superimposing optical system 250. The reflection element 214 may be configured by a mirror obtained by forming, on the substrate surface, a dielectric multilayer film that reflects an S-polarized light component. That is, in this embodiment, the reflection element 214 has a plate shape.

The phase difference element 220 is a plate-like member that aligns polarization directions of the second light L2 and the third light L3.

The phase difference element 220 in this embodiment is configured by a half wave plate and provided in an optical path of the third light L3 reflected by the reflection element 214. The phase difference element 220 in this embodiment is a plate-like member configured by, for example, extending plate-like or film-like resin or forming, with a nanoimprint method, a periodic structure smaller than the wavelength of light on the surface of a plastic substrate. The phase difference element 220 may be formed using an inorganic material such as crystal, sapphire, lithium niobate, or calcite.

The third light L3 reflected by the reflection element 214 is transmitted through the phase difference element 220. The third light L3 is transmitted through the phase difference element 220 to be converted into an S-polarized light component L3s from a P-polarized light component L3p. That is, the phase difference element 220 aligns the polarization direction (the S-polarized light component L3s) of the third light L3 with the polarization direction (an S-polarized light component L2s) of the second light L2.

In this way, the polarization conversion unit 200 in this embodiment can convert the nonpolarized illumination light L into the converted light L0 including the second light L2 and the third light L3 aligned with the S-polarized light. In this specification, the polarization directions of the second light L2 and the third light L3 being aligned includes not only a case in which the polarization directions of the second light L2 and the third light L3 completely coincide, that is, a state in which an angle formed by the polarization direction of each of the second light L2 and the third light L3 is 0° but also a state in which the angle formed by the polarization direction of each of the second light L2 and the third light L3 is within ±20°.

In the polarization conversion unit 200, the width in the left-right direction X of the light incident surface 213a of the polarizing separation element 213 is represented as first width H1 and the total width in the front-rear direction Y of the polarizing separation element 213 and the reflection element 214 is represented as second width H2. The first width H1 is equivalent to the light beam width of the illumination light L made incident on the polarization conversion unit 200 and the second width H2 is equivalent to the light beam width of the converted light L0 emitted from the polarization conversion unit 200. In the case of this embodiment, the second width H2 is equivalent to double of the first width H1.

With the polarization conversion unit 200 in this embodiment, it is possible to generate the converted light L0 having the light beam width twice as large as the light beam width of the illumination light L, the polarization direction of the converted light L0 being aligned with the predetermined linearly polarized light.

The polarization direction of the converted light L0 corresponds to a polarization direction in which the converted light L0 is transmitted through a transmission axis of the incident-side polarization plate 402 of the light modulation device 400. The predetermined linearly polarized light is equivalent to polarized light transmitted through the transmission axis of the incident-side polarization plate 402 of the light modulation device 400. That is, the polarization conversion unit 200 can convert the illumination light L into the converted light L0 of the predetermined linearly polarized light (S-polarized light) that can be transmitted through the incident-side polarization plate 402. The converted light L0 emitted from the polarization conversion unit 200 is made incident on the superimposing optical system 250.

Subsequently, a configuration of the superimposing optical system 250 is explained.

As shown in FIG. 1, the superimposing optical system 250 includes a first lens section 251 on which the second light L2 in the converted light L0 emitted from the polarization conversion unit 200 is made incident and a second lens section 252 on which the third light L3 in the converted light L0 emitted from the polarization conversion unit 200 is made incident.

The superimposing optical system 250 is configured by a Fresnel lens. That is, the first lens section 251 and the second lens section 252 are respectively configured by Fresnel lenses. Consequently, the thickness in the optical axis direction of the superimposing optical system 250 is reduced to reduce the dimension in the left-right direction X extending along the reference axis J of the projector 1.

The Fresnel lens configuring the first lens section 251 is decentered. The second light L2 emitted from the first lens section 251 is made to form an image in a position deviating to the rear side (−Y) in the front-rear direction Y orthogonal to the optical axis of the first lens section 251.

Similarly, the Fresnel lens configuring the second lens section 252 is decentered. The third light L3 emitted from the second lens section 252 is made to form an image in a position deviating to the front side (+Y) in the front-rear direction Y orthogonal to the optical axis of the second lens section 252.

The first lens section 251 and the second lens section 252 may be integrally formed or may be separately formed.

In the superimposing optical system 250 in this embodiment, a principal ray L2A of the second light L2 emitted from the first lens section 251 and a principal ray L3A of the third light L3 emitted from the second lens section 252 come closer to each other toward the light modulation device 400. Therefore, with the superimposing optical system 250, it is possible to superimpose the second light L2 and the third light L3 in a pixel formation region of the liquid crystal panel 401, which is a light irradiation region of the light modulation device 400, by adjusting the positions in the front-rear direction Y of the second light L2 and the third light L3. Accordingly, by superimposing the second light L2 and the third light L3, the superimposing optical system 250 can uniformize an in-plane brightness distribution of the converted light L0 illuminating the liquid crystal panel 401. Therefore, it is possible to generate an excellent image without brightness unevenness in a plane by the light modulation device 400.

Light emission surfaces of the first lens section 251 and the second lens section 252 may be disposed in a state in which the light emission surfaces are tilted to be directed to the reference axis J side of the projector 1 (a tilt state). In this case, the principal ray L2A of the second light L2 emitted from the first lens section 251 and the principal ray L3A of the third light L3 emitted from the second lens section 252 can be more easily brought close to each other. By tilting the first lens section 251 and the second lens section 252 in this way, it is possible to reduce an amount of eccentricity of the Fresnel lenses configuring the first lens section 251 and the second lens section 252.

By performing only tilt adjustment for the first lens section 251 and the second lens section 252, a superimposition amount on the liquid crystal panel 401 of the second light L2 and the third light L3 may be controlled to prevent the first lens section 251 and the second lens section 252 from being decentered.

The converted light L0 emitted from the superimposing optical system 250 is collimated by the collimating optical system 300 and made incident on the light modulation device 400. The polarization direction of the converted light L0 is aligned with the polarization direction of the polarized light transmitted through the transmission axis of the incident-side polarization plate 402 of the light modulation device 400 by the polarization conversion unit 200. Therefore, the converted light L0 is transmitted through the incident-side polarization plate 402 and efficiently made incident on the liquid crystal panel 401. Light modulated by the liquid crystal panel 401 is transmitted through the emission-side polarization plate 403 and emitted as the image light GL. The image light GL emitted from the light modulation device 400 in this way is condensed by the condensing optical system 350 and reflected by the mirror 450 to be made incident on the projection optical system 500 and emitted toward the not-shown screen.

As explained below, the projector 1 in this embodiment includes the light source 100 that emits the illumination light L, which is the nonlinearly polarized light (the nonpolarized light), the polarization conversion unit 200 that converts the illumination light L made incident from the light source 100 into the converted light L0, which is the predetermined linearly polarized light, the light modulation device 400 including the liquid crystal panel 401 which modulates the converted light L0 converted by the polarization conversion unit 200, and the superimposing optical system 250 that superimposes, on the liquid crystal panel 401, the converted light L0 made incident from the polarization conversion unit 200. The polarization conversion unit 200 includes the polarizing separator 210 that separates the illumination light L into the second light L2 and the third light L3 based on polarized light components and the phase difference element 220 that aligns the polarization directions of the second light L2 and the third light L3 with the predetermined linearly polarized light. The polarizing separator 210 includes the polarizing separation element 213 and the reflection element 214. The polarizing separation element 213 is provided in the tilted state with respect to the principal ray La of the illumination light L and separates the illumination light L by reflecting the S-polarized light component in the illumination light L toward the superimposing optical system 250 as the second light L2 and transmitting the P-polarized light component in the illumination light L as the third light L3. The reflection element 214 reflects the third light L3 made incident from the polarizing separation element 213 toward the superimposing optical system 250.

With the projector 1 in this embodiment, the polarization direction of the illumination light L, which is the nonpolarized light, emitted from the light source 100 can be converted into, by the polarization conversion unit 200, the converted light L0 aligned with the S-polarized light. Therefore, it is possible to more efficiently make the illumination light L emitted from the light source 100 incident on the liquid crystal panel 401 of the light modulation device 400 by converting the illumination light L into the S-polarized light compared with when the illumination light L, which is the nonpolarized light, is aligned with the S-polarized light using a polarization plate. Accordingly, it is possible to improve light use efficiency of the illumination light L emitted from the light source 100.

In the polarization conversion unit 200 in this embodiment, since the polarizing separation element 213 and the reflection element 214 respectively have plate shapes, it is possible to further reduce an apparatus configuration in weight than when a polarizing separation element and a reflection mirror are provided in an optical member such as a prism.

The polarization conversion unit 200 can expand, to the second width H2, the light beam width of the converted light L0 obtained by aligning, with the S-polarized light, the polarization direction of the illumination light L having the first width H1 made incident on the light incident surface 213a of the polarizing separation element 213. Therefore, the polarization conversion unit 200 can expand the light beam width of the illumination light L, which is the incident light, to double. Since the light beam width of the converted light L0 is expanded in this way, it is possible to reduce a degree of the superimposing optical system 250 expanding the light beam width of the converted light L0 (lens power). That is, since expansion magnification of the superimposing optical system 250 is reduced, it is possible to reduce the distance in the reference axis J direction from the superimposing optical system 250 to the light modulation device 400. It is possible to realize a reduction in the size of the projector 1.

Second Embodiment

Subsequently, a projector in a second embodiment is explained. A difference between this embodiment and the first embodiment is a configuration of a polarization conversion unit. The other components are common to this embodiment and the first embodiment. Therefore, the configuration of the polarization conversion unit is explained below. Members common to the first embodiment are denoted by the same reference numerals and signs and explanation is omitted about details of the members.

Figure 4:
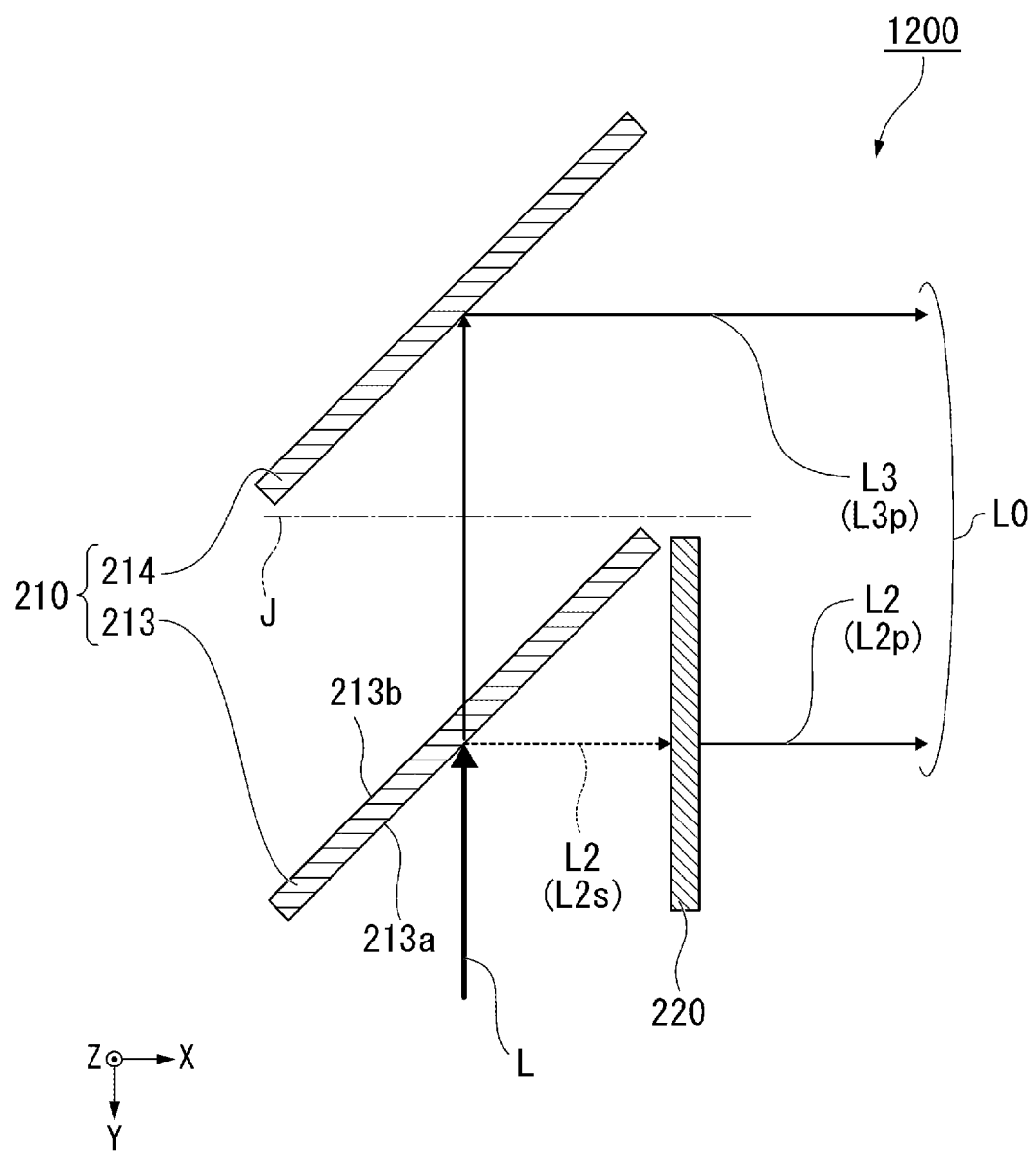
FIG. 4 is a plan view showing a main part configuration of a polarization conversion unit in a second embodiment.

FIG. 4 is a plan view showing a main part configuration of a polarization conversion unit 1200 in this embodiment. FIG. 4 is a plan view of the polarization conversion unit 1200 viewed from the upper side (+Z).

As shown in FIG. 4, in the polarization conversion unit 1200 in this embodiment, the phase difference element 220 is provided in an optical path of the second light L2 reflected by the polarizing separation element 213. That is, the phase difference element 220 is provided on the light incident surface 213a side of the polarizing separation element 213.

In the case of the polarization conversion unit 1200 in this embodiment, the third light L3 transmitted through the polarizing separation element 213 and separated from the illumination light L is emitted without being transmitted through the phase difference element 220.

On the other hand, the second light L2 reflected by the polarizing separation element 213 and separated from the illumination light L is transmitted through the phase difference element 220. The second light L2 is transmitted through the phase difference element 220 to be converted into a P-polarized light component L2p from the S-polarized light component L2s. The phase difference element 220 can align the polarization direction (the P-polarized light component L2p) of the second light L2 with the polarization direction (the P-polarized light component L3p) of the third light L3.

As explained above, with the polarization conversion unit 1200 in this embodiment, since the converted light L0 converted into the P-polarized light is made incident on the light modulation device 400 including the incident-side polarization plate 402, a polarized light transmission axis of which is set to the P-polarized light, it is possible to efficiently make the converted light L0 incident on the liquid crystal panel 401. Accordingly, it is possible to improve light use efficiency of the illumination light L emitted from the light source 100.

Third Embodiment

Subsequently, a projector in a third embodiment is explained. A difference between this embodiment and the first embodiment is a configuration of a polarization conversion unit. The other components are common to this embodiment and the first embodiment. Therefore, the configuration of the polarization conversion unit is explained below. Members common to the first embodiment are denoted by the same reference numerals and signs and explanation is omitted about details of the members.

Figure 5:
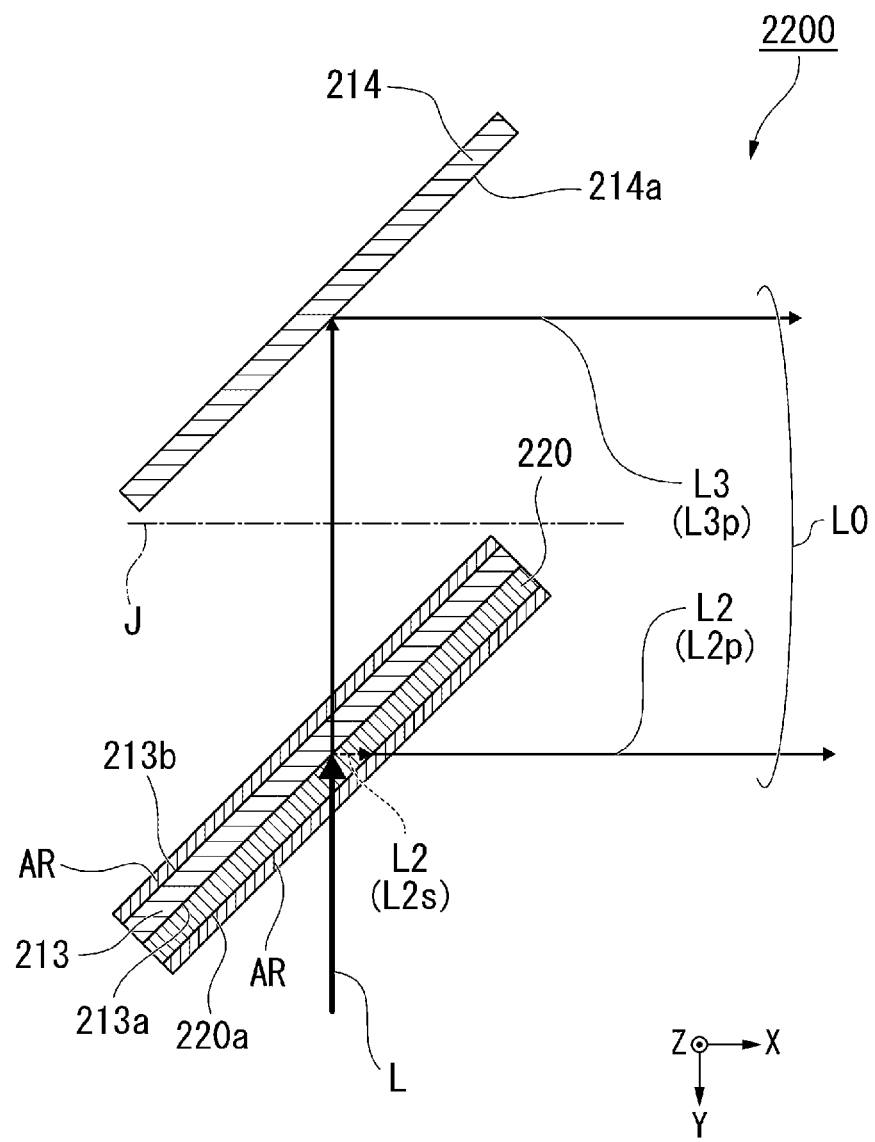
FIG. 5 is a plan view showing a main part configuration of a polarization conversion unit in a third embodiment.

FIG. 5 is a plan view showing a main part configuration of a polarization conversion unit 2200 in this embodiment. FIG. 5 is a plan view of the polarization conversion unit 2200 viewed from the upper side (+Z).

As shown in FIG. 5, in the polarization conversion unit 2200, the phase difference element 220 is directly provided on the light incident side of the polarizing separation element 213. That is, the phase difference element 220 is provided on the light incident surface 213a of the polarizing separation element 213.

In the case of this embodiment, the reflection prevention film AR is provided on a surface 220a of the phase difference element 220. Consequently, since reflection of the illumination light L by the interface between the surface 220a of the phase difference element 220 and the air layer is suppressed, the illumination light L can be efficiently made incident on the phase difference element 220.

The reflection prevention film AR is provided on the light emission surface 213b of the polarizing separation element 213 as well. Consequently, since reflection of light by the interface between the light emission surface 213b of the polarizing separation element 213 and the air layer is suppressed, it is possible to efficiently emit the third light L3 transmitted through the polarizing separation element 213.

In the polarization conversion unit 2200 in this embodiment, the illumination light L is transmitted through the phase difference element 220 provided on the light incident side of the polarizing separation element 213. At this time, a polarization state of the illumination light L, which is the nonpolarized light, does not change before and after the transmission through the phase difference element 220. The illumination light L transmitted through the phase difference element 220 is made incident on the polarizing separation element 213 and is separated into the second light L2 and the third light L3.

The third light L3 is transmitted through the polarizing separation element 213 to be separated from the illumination light L and is reflected toward the superimposing optical system 250 by the reflection element 214.

On the other hand, the second light L2 reflected by the polarizing separation element 213 and separated from the illumination light L is transmitted through the phase difference element 220 and made incident on the superimposing optical system 250. The second light L2 is transmitted through the phase difference element 220 to be converted into the P-polarized light component L2p from the S-polarized light component L2s.

The phase difference element 220 in this embodiment can align the polarization direction (the P-polarized light component L2p) of the second light L2 with the polarization direction (the P-polarized light component L3p) of the third light L3.

As explained above, in the polarization conversion unit 2200 in this embodiment as well, by converting the polarization direction of the converted light L0 into a polarization direction in which the converted light L0 can be transmitted through the incident-side polarization plate 402, it is possible to efficiently make the converted light L0 incident on the liquid crystal panel 401. Accordingly, it is possible to improve light use efficiency of the illumination light L emitted from the light source 100.

Fourth Embodiment

Subsequently, a projector in a fourth embodiment is explained. A difference between this embodiment and the first embodiment is a configuration of a polarization conversion unit. The other components are common to this embodiment and the first embodiment. Therefore, the configuration of the polarization conversion unit is explained below. Members common to the first embodiment are denoted by the same reference numerals and signs and explanation is omitted about details of the members.

Figure 6:
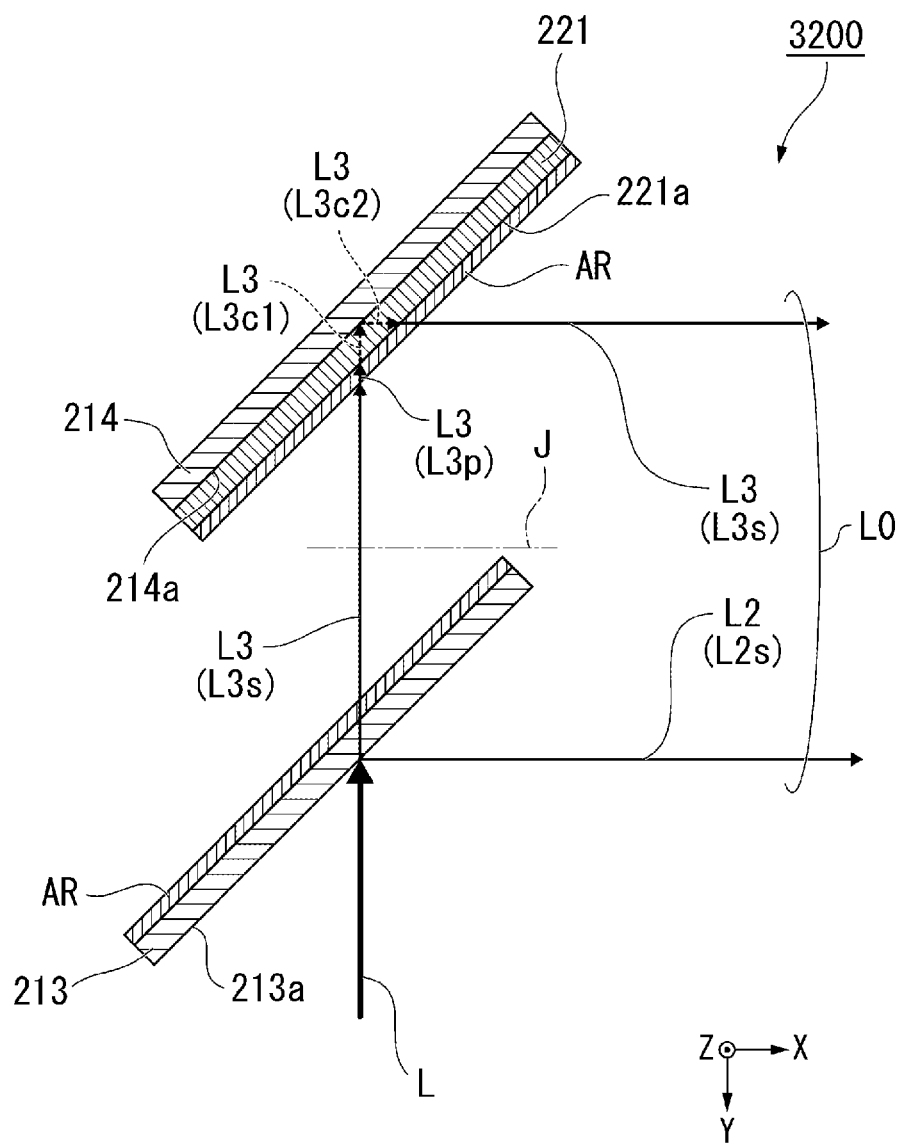
FIG. 6 is a plan view showing a main part configuration of a polarization conversion unit in a fourth embodiment.

FIG. 6 is a plan view showing a main part configuration of a polarization conversion unit 3200 in this embodiment. FIG. 6 is a plan view of the polarization conversion unit 3200 viewed from the upper side (+Z).

As shown in FIG. 6, in the polarization conversion unit 3200, a phase difference element 221 is directly provided in the reflection element 214. Specifically, the phase difference element 221 is provided on the light reflection surface 214a of the reflection element 214.

In the case of this embodiment, the reflection prevention film AR is provided on a surface 221a of the phase difference element 221. Consequently, since reflection of the illumination light L by the interface between the surface 221a of the phase difference element 221 and the air layer is suppressed, the illumination light L can be efficiently made incident on the phase difference element 221.

The reflection prevention film AR is provided on the light emission surface 213b of the polarizing separation element 213 as well. Consequently, since reflection of light by the interface between the light emission surface 213b of the polarizing separation element 213 and the air layer is suppressed, it is possible to efficiently emit the third light L3 transmitted through the polarizing separation element 213.

The phase difference element 221 in this embodiment is configured by a quarter wave plate. The phase difference element 221 in this embodiment is a plate-like member configured by, for example, extending plate-like resin or forming, with the nanoimprint method, a periodic structure smaller than the wavelength of light on the surface of a plastic substrate. The phase difference element 221 may be formed using an inorganic material such as crystal, sapphire, lithium niobate, or calcite.

In the polarization conversion unit 3200 in this embodiment, the second light L2 reflected by the polarizing separation element 213 and separated from the illumination light L is emitted toward the superimposing optical system 250.

On the other hand, the third light L3 transmitted through the polarizing separation element 213 and separated from the illumination light L is transmitted through the phase difference element 221 and made incident on the reflection element 214. The third light L3, which is the P-polarized light component L3$p$, is transmitted through the phase difference element 221 to be converted into circularly polarized light L3$c$1. The third light L3 converted into the circularly polarized light L3$c$1 is reflected by the reflection element 214. The third light L3, which is the circularly polarized light L3$c$1, is reflected by the reflection element 214 to be converted into circularly polarized light L3$c$2, a rotation direction of which is opposite to a rotation direction of the circularly polarized light L3$c$1. The third light L3, which is the circularly polarized light L3$c$2, is transmitted through the phase difference element 221 again to be converted into the S-polarized light component L3$s$ and emitted toward the superimposing optical system 250.

The phase difference element 221 in this embodiment can align the polarization direction (the S-polarized light component L3$s$) of the third light L3 with the polarization direction (the S-polarized light component L2$s$) of the second light L2.

As explained above, in the polarization conversion unit 3200 in this embodiment as well, by converting the polarization direction of the converted light L0 into the polarization direction in which the converted light L0 can be transmitted through the incident-side polarization plate 402, it is possible to efficiently make the converted light L0 incident on the liquid crystal panel 401. Accordingly, it is possible to improve light use efficiency of the illumination light L emitted from the light source 100.

Fifth Embodiment

Subsequently, a projector in a fifth embodiment is explained. A difference between this embodiment and the first embodiment is a configuration of a polarization conversion unit. The other components are common to this embodiment and the first embodiment. Therefore, the configuration of the polarization conversion unit is explained below. Members common to the first embodiment are denoted by the same reference numerals and signs and explanation is omitted about details of the members.

Figure 7:
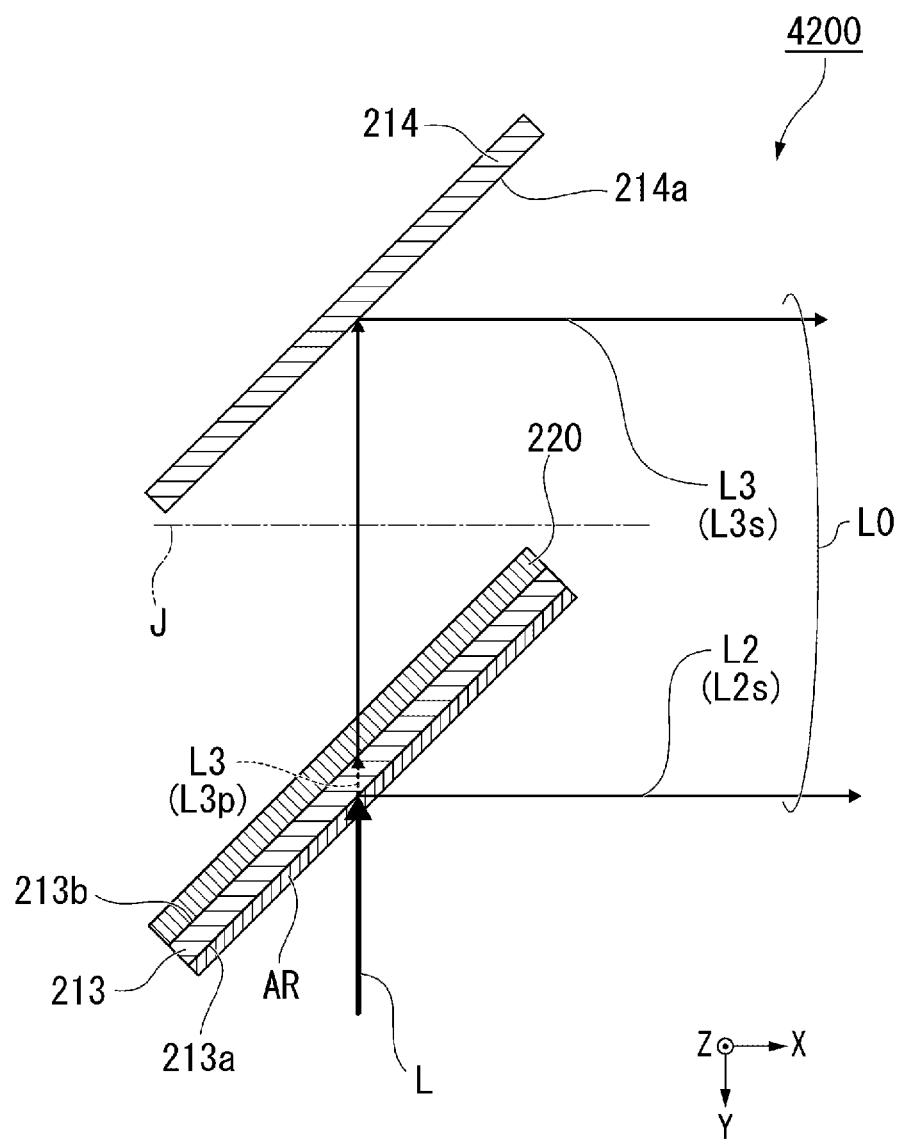
FIG. 7 is a plan view showing a main part configuration of a polarization conversion unit in a fifth embodiment.

FIG. 7 is a plan view showing a main part configuration of a polarization conversion unit 4200 in this embodiment. FIG. 7 is a plan view of the polarization conversion unit 4200 viewed from the upper side (+Z).

As shown in FIG. 7, in the polarization conversion unit 4200, the phase difference element 220 is directly provided on the light emission side of the polarizing separation element 213. That is, the phase difference element 220 is provided on the light emission surface 213$b$ of the polarizing separation element 213.

In the case of this embodiment, the reflection prevention film AR is provided on the light incident surface 213$a$ of the polarizing separation element 213. Consequently, since reflection of the illumination light L by the interface between the light incident surface 213$a$ of the polarizing separation element 213 and the air layer is suppressed, the illumination light L can be efficiently made incident on the polarizing separation element 213.

In the polarization conversion unit 4200 in this embodiment, the second light L2 reflected by the polarizing separation element 213 and separated from the illumination light L is emitted toward the superimposing optical system 250.

On the other hand, the third light L3 transmitted through the polarizing separation element 213 and separated from the illumination light L is transmitted through the phase difference element 220. The third light L3 is transmitted through the phase difference element 220 to be converted into the S-polarized light component L3$s$ from the P-polarized light component L3$p$. The phase difference element 220 can align the polarization direction (the S-polarized light component L3$s$) of the third light L3 with the polarization direction (the S-polarized light component L2$s$) of the second light L2.

As explained above, in the polarization conversion unit 4200 in this embodiment as well, by converting the polarization direction of the converted light L0 into the polarization direction in which the converted light L0 can be transmitted through the incident-side polarization plate 402, it is possible to efficiently make the converted light L0 incident on the liquid crystal panel 401. Accordingly, it is possible to improve light use efficiency of the illumination light L emitted from the light source 100.

Sixth Embodiment

Subsequently, a projector in a sixth embodiment is explained. A difference between this embodiment and the first embodiment is a configuration of a polarization conversion unit. The other components are common to this embodiment and the first embodiment. Therefore, the configuration of the polarization conversion unit is explained below. Members common to the first embodiment are denoted by the same reference numerals and signs and explanation is omitted about details of the members.

Figure 8:
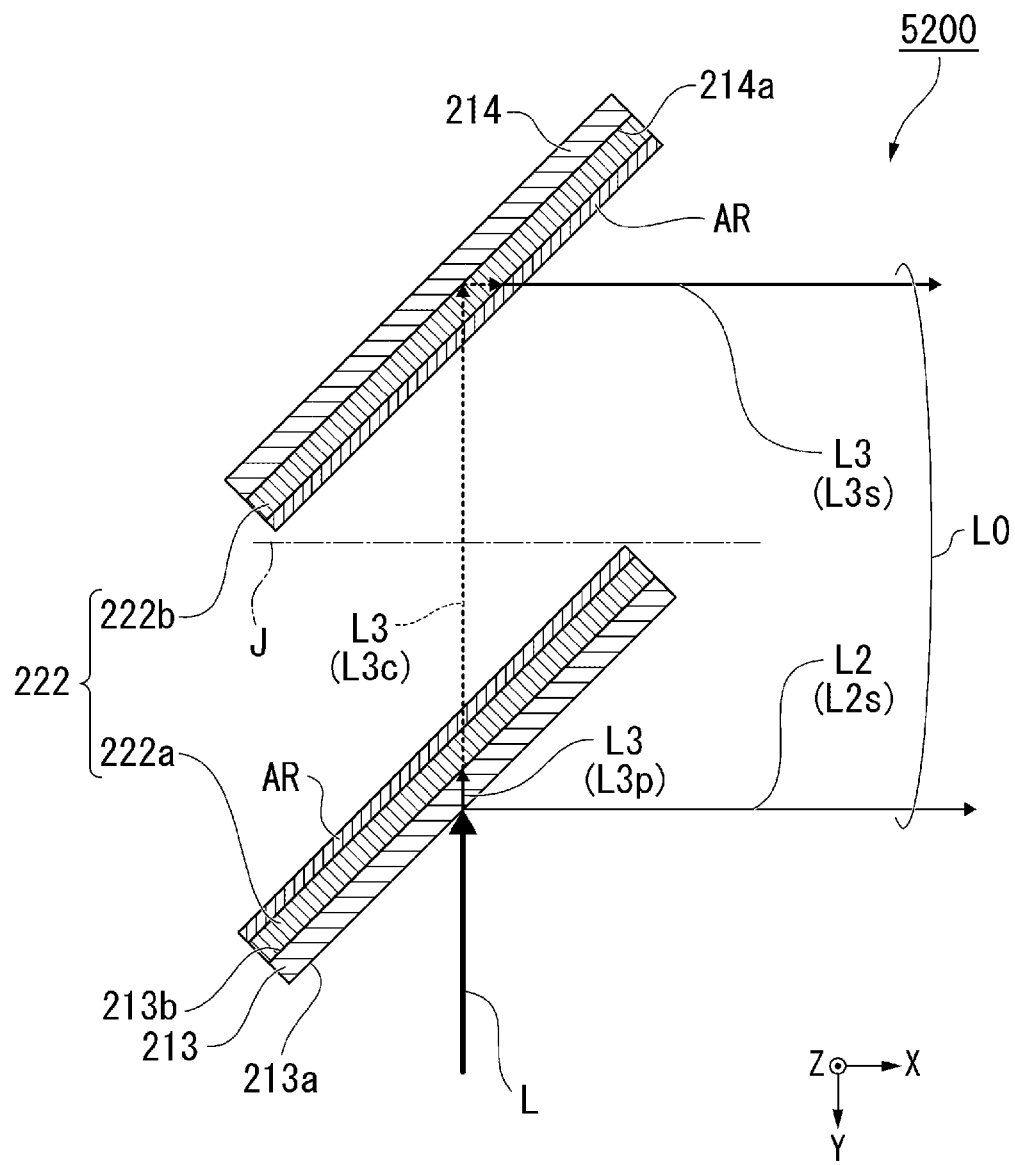
FIG. 8 is a plan view showing a main part configuration of a polarization conversion unit in a sixth embodiment.

FIG. 8 is a plan view showing a main part configuration of a polarization conversion unit 5200 in this embodiment. FIG. 8 is a plan view of the polarization conversion unit 5200 viewed from the upper side (+Z).

As shown in FIG. 8, in the polarization conversion unit 5200, a phase difference element 222 includes a first element 222$a$ and a second element 222$b$.

The first element 222$a$ is directly provided on the light emission side of the polarizing separation element 213. Specifically, the first element 222$a$ is provided on the light emission surface 213$b$ of the polarizing separation element 213.

The second element 222$b$ is directly provided on the light incident side of the reflection element 214. Specifically, the second element 222$b$ is provided on the light reflection surface 214$a$ of the reflection element 214.

In the case of this embodiment, reflection prevention films AR are respectively provided on the light emission side of the first element 222$a$ and the light incident side of the second element 222$b$. Consequently, since reflection of light by the interface between the first element 222$a$ and the second element 222$b$ and the air layer is suppressed, it is possible to efficiently emit the third light L3 from the first element 222$a$ and efficiently make the third light L3 incident on the reflection element 214.

The first element 222a is configured by a quarter wave plate and the second element 222b is configured by a ⅛ phase difference plate. The first element 222a and the second element 222b are plate-like members configured by, for example, extending plate-like resin or forming, with the nanoimprint method, a periodic structure smaller than the wavelength of light on the surface of a plastic substrate. The first element 222a and the second element 222b may be formed using an inorganic material such as crystal, sapphire, lithium niobate, or calcite.

In the polarization conversion unit 5200 in this embodiment, the second light L2 separated from the illumination light L by the polarizing separation element 213 is emitted toward the superimposing optical system 250. On the other hand, the third light L3, which is the P-polarized light component L3p, transmitted through the polarizing separation element 213 is transmitted through the first element 222a to be converted into circularly polarized light L3c. The third light L3 converted into the circularly polarized light L3c is transmitted through the second element 222b, made incident on the reflection element 214, and emitted toward the superimposing optical system 250. At this time, the circularly polarized light L3c is reflected by the reflection element 214 to be converted into a circularly polarized light, a rotation direction of which is opposite to a rotation direction of the circularly polarized light L3c, and is reciprocatingly transmitted through the second element 222b to be imparted with a phase difference for a quarter wavelength and is converted into the S-polarized light component L3s.

The phase difference element 222 in this embodiment can align the polarization direction (the S-polarized light component L3s) of the third light L3 with the polarization direction (the S-polarized light component L2s) of the second light L2.

As explained above, in the polarization conversion unit 5200 in this embodiment as well, by converting the polarization direction of the converted light L0 into the polarization direction in which the converted light L0 can be transmitted through the incident-side polarization plate 402, it is possible to efficiently make the converted light L0 incident on the liquid crystal panel 401. Accordingly, it is possible to improve light use efficiency of the illumination light L emitted from the light source 100.

Seventh Embodiment

Subsequently, a projector according to a seventh embodiment is explained. A difference between this embodiment and the first embodiment is a configuration of a polarization conversion unit. The other components are common to this embodiment and the first embodiment. Therefore, the configuration of the polarization conversion unit is explained below. Members common to the first embodiment are denoted by the same reference numerals and signs and explanation is omitted about details of the members.

Figure 9:
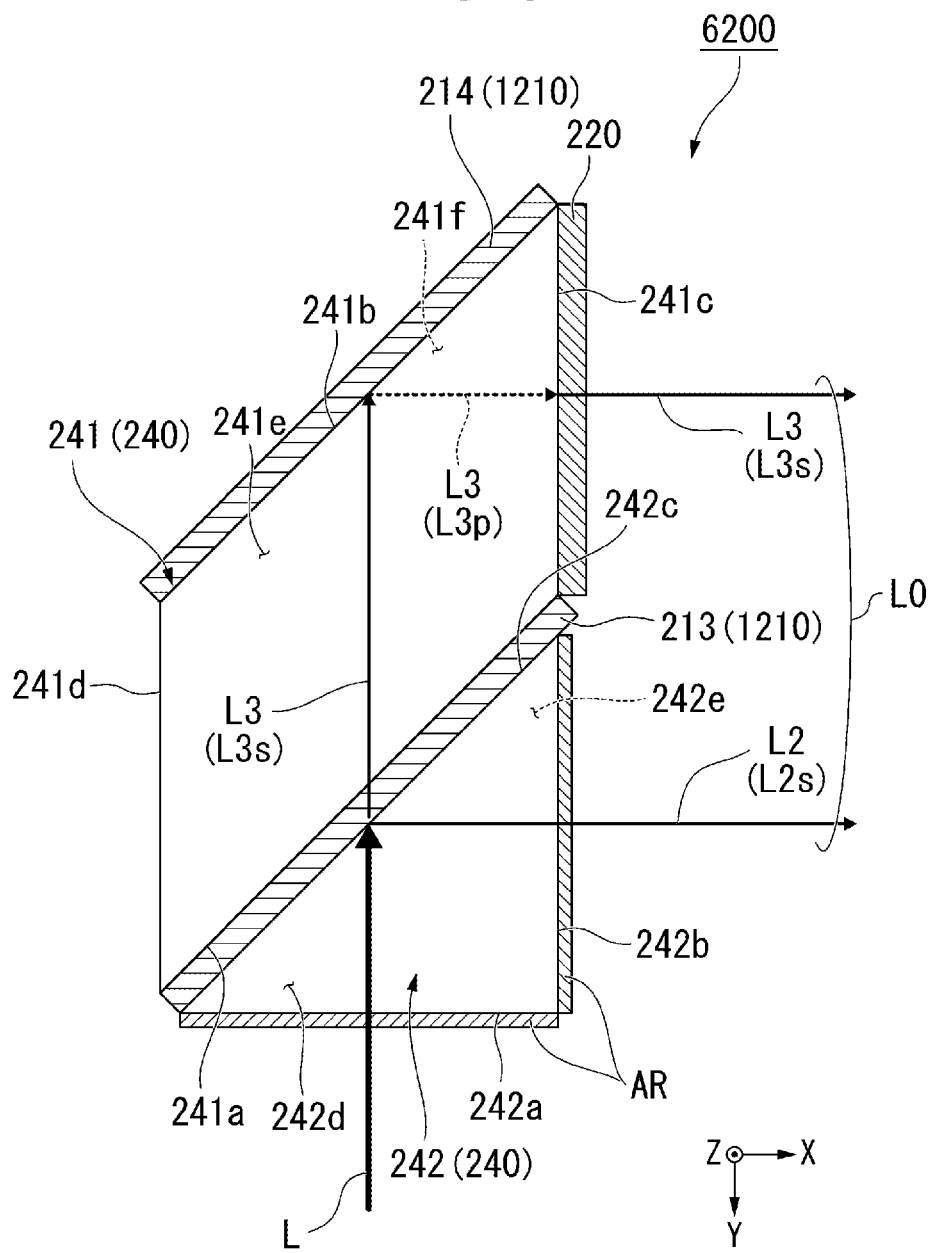
FIG. 9 is a plan view showing a main part configuration of a polarization conversion unit in a seventh embodiment.

FIG. 9 is a plan view showing a main part configuration of a polarization conversion unit 6200 in this embodiment. FIG. 9 is a plan view of the polarization conversion unit 6200 viewed from the upper side (+Z).

As shown in FIG. 9, in the polarization conversion unit 6200, a polarizing separator 1210 further includes a light transmissive member 240 that holds the polarizing separation element 213 and the reflection element 214. The light transmissive member 240 is configured by a first light transmissive member 241 and a second light transmissive member 242.

The first light transmissive member 241 is configured by a quadrangular prism, a plane shape of which is a parallelogram. The first light transmissive member 241 is made of a light transmissive material such as optical glass or plastic. The first light transmissive member 241 includes a first surface 241a, a second surface 241b, a third surface 241c, a fourth surface 241d, an upper end face 241e, and a lower end face 241f. The upper end face 241e is a surface forming the end portion on the upper side (+Z) of the first light transmissive member 241. The lower end face 241f is a surface forming the end portion on the lower side (−Z) of the first light transmissive member 241.

The first surface 241a is a surface crossing the upper end face 241e and the lower end face 241f, the illumination light L being made incident on the surface. In the case of this embodiment, the polarizing separation element 213 is provided on the first surface 241a.

The second surface 241b is a surface crossing the upper end face 241e and the lower end face 241f and facing the rear side (−Y) opposite to the first surface 241a. The first surface 241a and the second surface 241b have areas equal to each other. In the case of this embodiment, the reflection element 214 is provided on the second surface 241b.

The first surface 241a and the second surface 241b are disposed to be parallel to each other and form an angle of 35° to 55°, specifically, 45° with respect to the illumination optical axis AX of the illumination light L.

The third surface 241c is a surface crossing the upper end face 241e and the lower end face 241f and connecting the right sides (+X), which are one ends, of the first surface 241a and the second surface 241b. In the case of this embodiment, the phase difference element 220 is provided on the third surface 241c.

The fourth surface 241d is a surface crossing the upper end face 241e and the lower end face 241f and connecting the left sides (−X), which are the other ends, of the first surface 241a and the second surface 241b and parallel to the third surface 241c. The third surface 241c and the fourth surface 241d have areas equal to each other. A reflection mirror may be provided on the fourth surface 241d to reflect light made incident on the fourth surface 241d toward the second surface 241b or the third surface 241c.

The second light transmissive member 242 is configured by a triangular prism, a plane shape of which is a triangle. The second light transmissive member 242 is made of a light transmissive material such as optical glass or plastic. The second light transmissive member 242 is bonded to the first light transmissive member 241, for example, via an optical adhesive. The second light transmissive member 242 includes a fifth surface 242a, a sixth surface 242b, a seventh surface 242c, an upper end face 242d, and a lower end face 242e. The upper end face 242d is a surface forming the end portion on the upper side (+Z) of the second light transmissive member 242. The lower end face 242e is a surface forming the end portion on the lower side (−Z) of the second light transmissive member 242.

The fifth surface 242a is a surface crossing the upper end face 241e and the lower end face 241f, the illumination light L being made incident on the surface. The sixth surface 242b is a surface crossing the upper end face 241e, the lower end face 241f, and the fifth surface 242a and parallel to the third surface 241c of the first light transmissive member 241. The sixth surface 242b has an area equal to the area of the third surface 241c of the first light transmissive member 241.

The seventh surface 242c crosses the upper end face 241e, the lower end face 241f, the fifth surface 242a. Also, the seventh surface 242c extends along the first surface 241a of the first light transmissive member 241. The polarizing separation element 213 is sandwiched between the seventh surface 242c and the first surface 241a of the first light transmissive member 241 as explained below.

In this embodiment, the positions in the left-right direction X of the third surface 241c of the first light transmissive member 241 and the sixth surface 242b of the second light transmissive member 242 coincide. That is, the third surface 241c and the sixth surface 242b are flush with each other.

In the case of this embodiment, the reflection prevention films AR are provided on the fifth surface 242a and the sixth surface 242b of the second light transmissive member 242. Consequently, it is possible to suppress reflection by the interface between the fifth surface 242a and the sixth surface 242b and the air layer. Accordingly, it is possible to make the illumination light L incident on the fifth surface 242a of the second light transmissive member 242. It is possible to efficiently emit the second light L2 from the sixth surface 242b of the second light transmissive member 242.

Since the illumination light L is made incident on the first light transmissive member 241 through the second light transmissive member 242 rather than being directly made incident on the first light transmissive member 241 from the air layer, it is possible to suppress refraction of the illumination light L made incident on the first light transmissive member 241.

In the case of this embodiment, the polarizing separation element 213 is provided on the first surface 241a of the first light transmissive member 241. The polarizing separation element 213 is sandwiched between the first surface 241a of the first light transmissive member 241 and the seventh surface 242c of the second light transmissive member 242. The polarizing separation element 213 in this embodiment is configured by, for example, a dielectric multilayer film.

In the polarizing separation element 213, the light incident surface 213a is in contact with the seventh surface 242c of the second light transmissive member 242 and the light emission surface 213b is in contact with the first surface 241a of the first light transmissive member 241.

In the polarization conversion unit 6200 in this embodiment, the polarizing separation element 213 and the reflection element 214 are provided in the light transmissive member 240. Therefore, the polarizing separation element 213 and the reflection element 214 can easily improve position accuracy thereof by being provided in the same member.

As explained above, in the polarization conversion unit 6200 in this embodiment as well, by converting the polarization direction of the converted light L0 into the polarization direction in which the converted light L0 can be transmitted through the incident-side polarization plate 402, it is possible to efficiently make the converted light L0 incident on the liquid crystal panel 401. Accordingly, it is possible to improve light use efficiency of the illumination light L emitted from the light source 100.

Since the polarization conversion unit 6200 in this embodiment includes the first light transmissive member 241 on the light emission side of the polarizing separation element 213, the third light L3 can be efficiently taken out as the converted light L0 by suppressing total reflection of the third light L3 by the interface between the polarizing separation element 213 and the air layer.

In the polarization conversion unit 6200, since the polarizing separation element 213 and the reflection element 214 are stably held by the light transmissive member 240, it is possible to stabilize a positional relation between the polarizing separation element 213 and the reflection element 214, for example, even in vibration at the time when the projector 1 is used.

The light transmissive member 240 may be configured by only the first light transmissive member 241. That is, the second light transmissive member 242 may be omitted according to a degree of a design request.

In the polarization conversion unit 6200 in this embodiment, an example is explained in which the light transmissive member 240 is combined with the polarization conversion unit 200 in the first embodiment. However, the light transmissive member 240 may be combined with the polarization conversion units in the second to sixth embodiments.

Eighth Embodiment

Subsequently, a projector in an eighth embodiment is explained. A difference between this embodiment and the first embodiment is a layout of components in an exterior housing of the projector. The other components are common to this embodiment and the first embodiment. Therefore, the layout of components in the exterior housing is explained below. Members common to the first embodiment are denoted by the same reference numerals and signs and explanation is omitted about details of the members.

Figure 10:
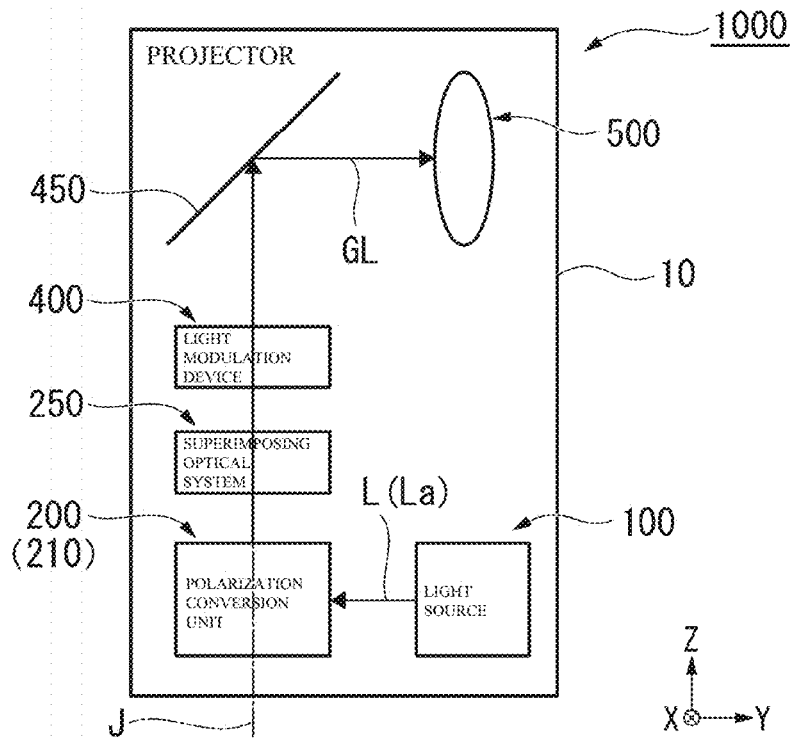
FIG. 10 is a side view showing an internal layout of a projector in an eighth embodiment.

FIG. 10 is a side view showing an internal layout of the projector 1000 in this embodiment. In FIG. 10, the members are schematically illustrated in order to mainly explain the layout of the components.

As shown in FIG. 10, in the projector 1000 in this embodiment, the polarization conversion unit 200, the superimposing optical system 250, and the light modulation device 400 are disposed side by side in the up-down direction Z in the exterior housing 10. That is, a direction extending along the reference axis J, which is a direction in which the polarization conversion unit 200, the superimposing optical system 250, and the light modulation device 400 are disposed side by side in the exterior housing 10, is the up-down direction Z orthogonal to the inner surface 12a of the second wall 12. Therefore, in the projector 1000 in this embodiment, the exterior housing 10 has an elongated shape in the up-down direction Z.

In the projector 1000 in this embodiment, the first direction (the −Y direction) extending along the principal ray La of the illumination light L made incident on the polarizing separator 210 and the second direction (the +Y direction) extending along the principal ray of the image light GL emitted from the mirror 450 toward the projection optical system 500 are opposite directions.

In the projector 1000 in this embodiment, the light source 100 and the projection optical system 500 are disposed on the same side (the front side (+Y)) with respect to the reference axis J. In contrast, when the first direction and the second direction are the same direction, the light source 100 is disposed on the front side (+Y), which is one side of the reference axis J, and the projection optical system 500 is disposed on the rear side (−Y), which is the other side of the reference axis J.

In the projector 1000 in this embodiment, since the light source 100 and the projection optical system 500 are disposed on the same side with respect to the reference axis J, it is possible to further reduce dimensions in the front-rear direction Y compared with when the light source 100 and the projection optical system 500 are disposed on opposite sides with respect to the reference axis J.

The light source 100 and the projection optical system 500 are components having large weights among constituent components of the projector 1000. In the case of this embodiment, since the light source 100 and the projection optical system 500 having the large weights are disposed on the same side with respect to the reference axis J, the light source 100 and the projection optical system 500 are disposed to at least partially overlap in the up-down direction Z. With this configuration, a weight balance of the components in the exterior housing 10 is less easily collapsed in the front-rear direction Y compared with when the light source 100 and the projection optical system 500 are separated in the front-rear direction Y, that is, when the light source 100 and the projection optical system 500 are disposed on the opposite side with respect to the reference axis J. Therefore, the projector 1000 including the exterior housing 10 elongated in the up-down direction Z as in this embodiment has increased stability at an installation time to suppress toppling in the front-rear direction Y.

In the projector 1000 in this embodiment, an example is explained in which the layout change is performed using the polarization conversion unit 200 in the first embodiment. However, the layout change may be performed using the polarization conversion units in the second to sixth embodiments.

The technical scope of the present disclosure is not limited to the embodiments explained above. Various changes can be added in a range not departing from the gist of the present disclosure.

Besides, specific configurations such as the numbers, dispositions, shapes, and materials of the various components configuring the projector are not limited to the embodiments explained above and can be changed as appropriate.

For example, in the embodiments, an example is explained in which the superimposing optical system 250 that superimposes the converted light L0 on the light modulation device 400 is configured by the Fresnel lens. However, the superimposing optical system 250 may be configured by a concave lens instead of the Fresnel lens. That is, the first lens section 251 and the second lens section 252 may be respectively configured by concave lenses. In this case, the optical axes of the concave lenses configuring the first lens section 251 and the second lens section 252 are disposed in a state in which the optical axes are further tilted in a direction approaching the reference axis J (a tilt state) toward the light modulation device 400.

The superimposing optical system 250 may be configured by reflectors instead of the Fresnel lens. That is, the first lens section 251 may be replaced with a first reflector (a first optical member) and the second lens section 252 may be replaced with a second reflector (a second optical member). By adjusting, as appropriate, installation angles of the first reflector and the second reflector and incident angles of the second light L2 and the third light L3 on the first reflector and the second reflector, the principal ray L2A of the second light L2 emitted from the first reflector and the principal ray L3A of the third light L3 emitted from the second reflector can be brought closer to each other toward the light modulation device 400. That is, the second light L2 reflected by the first reflector and the third light L3 reflected by the second reflector can be superimposed on the light modulation device 400.

When the superimposing optical system 250 is configured by the reflectors, it is easy to adjust the incident angles of the second light L2 and the third light L3 on the reflectors if the optical system 150 that collimates the illumination light L emitted from the light source 100 is omitted.

In the embodiments, an example is explained in which the polarizing separation element 213 is configured by the dielectric multilayer film. However, the polarizing separation element 213 may be configured by a wire grid-type polarizing element in which a plurality of metal thin wires made of aluminum or the like are provided on the entire surface of a substrate at a fine pitch. When the wire grid-type polarizing element is used, it is possible to increase heat resistance of the polarizing separation element 213.

Modification

A configuration in which a polarizing separation element configured by a wire grid-type polarizing element is used is explained below as a modification.

Figure 11:
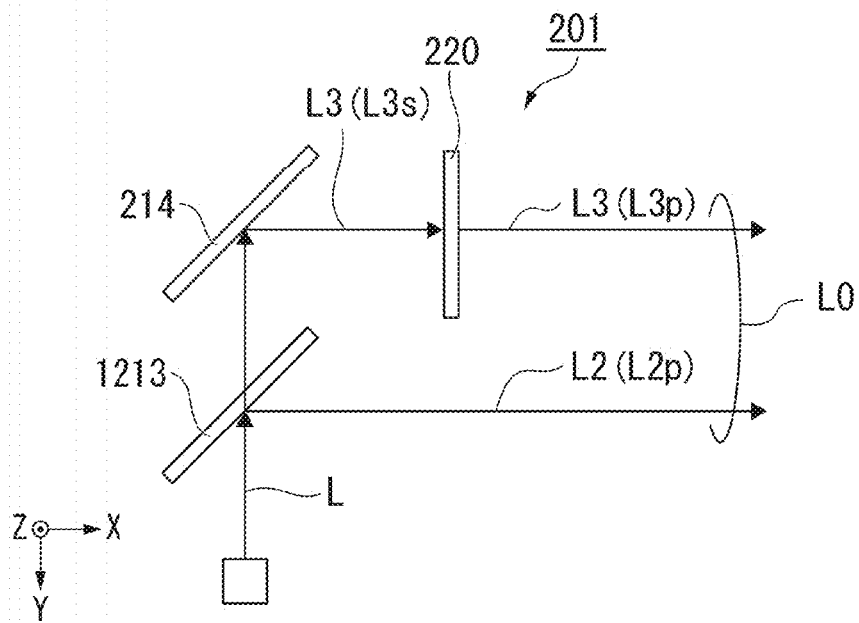
FIG. 11 is a plan view showing a main part configuration of a polarization conversion unit in a modification.

FIG. 11 is a plan view showing a main part configuration of a polarization conversion unit 201 according to the modification. FIG. 11 is a plan view of the polarization conversion unit 201 viewed from the upper side (+Z).

In the polarization conversion unit 201 in this modification shown in FIG. 11, the polarizing separation element 213 configured by the dielectric multilayer film in the polarization conversion unit 200 in the first embodiment is replaced with a polarizing separation element 1213 configured by a wire grid-type polarizing element.

The polarizing separation element 213 in the first embodiment reflects the S-polarized light component (the first linearly polarized light component) in the illumination light L as the second light L2 and transmits the P-polarized light component (the second linearly polarized light component) in the nonpolarized illumination light L as the third light L3.

In contrast, for example, by adjusting an array direction and an angle of the plurality of metal thin wires with respect to the illumination light L, the polarizing separation element 1213 in this modification configured by the wire grid-type polarizing element can reflect the P-polarized light component (the first linearly polarized light component) L2p in the illumination light L as the second light L2 and transmit the S-polarized light component (the second linearly polarized light component) L3s in the nonpolarized illumination light L as the third light L3.

Therefore, in the polarization conversion unit 201 in this modification, the second light L2, which is the P-polarized light component L2p, transmitted through the polarizing separation element 1213 and separated from the illumination light L is emitted. The third light L3, which is the S-polarized light component L3s, reflected by the polarizing separation element 1213 and separated from the illumination light L is transmitted through the phase difference element 220. The third light L3 is transmitted through the phase difference element 220 to be converted into the P-polarized light component L3p from the S-polarized light component L3s.

As explained above, with the polarization conversion unit 201 in this modification, by aligning the polarization direction (the P-polarized light component L3p) of the third light L3 with the polarization direction (the P-polarized light component L2p) of the second light L2, the phase difference element 220 can convert the polarization direction of the converted light L0 into the P-polarized light that can be transmitted through the incident-side polarization plate 402 and efficiently make the converted light L0 incident on the light modulation device 400. Accordingly, it is possible to improve light use efficiency of the illumination light L emitted from the light source 100.

In this modification, the polarization conversion unit 200 in the first embodiment is explained as an example. However, the polarizing separation element in any one of the polarization conversion units in the second to seventh embodiments may be replaced with the wire grid-type polarizing element.

A summary of the present disclosure is noted below.

Note 1

A projector including:
- a light source configured to emit first light, which is non-linearly polarized light;
- a polarization conversion unit configured to convert the first light made incident from the light source into predetermined linearly polarized light;
- a light modulation device including a liquid crystal panel which modulates the predetermined linearly polarized light converted by the polarization conversion unit; and
- a superimposing optical system configured to superimpose, on the liquid crystal panel, the predetermined linearly polarized light made incident from the polarization conversion unit, wherein the polarization conversion unit includes:
- a polarizing separator configured to separate the first light into second light and third light based on polarized light components; and
- a phase difference element configured to align polarization directions of the second light and the third light with the predetermined linearly polarized light, the polarizing separator includes a polarizing separation element and a reflection element, the polarizing separation element is provided in a tilted state with respect to a principal ray of the first light and separates the first light by reflecting a first linearly polarized light component in the first light toward the superimposing optical system as the second light and transmitting, as the third light, a second linearly polarized light component in a polarization direction different from a polarization direction of the first linearly polarized light component in the first light, and the reflection element reflects the third light made incident from the polarizing separation element toward the superimposing optical system.

With the projector in this configuration, a polarization direction of the first light, which is the nonpolarized light, emitted from the light source can be converted into, by the polarization conversion unit, converted light aligned with a predetermined polarization direction. Therefore, it is possible to more efficiently make the first light emitted from the light source incident on the liquid crystal panel of the light modulation device by converting the first light emitted from the light source into the predetermined polarization direction compared with when the polarization direction of the first light is aligned using a polarization plate. Accordingly, it is possible to improve light use efficiency of the first light emitted from the light source.

The polarization conversion unit can reduce expansion magnification of the superimposing optical system by setting a light beam width of the converted light larger than a light beam width of the first light. Consequently, it is possible to reduce the distance from the superimposing optical system to the light modulation device and realize a reduction in the size of the projector.

Note 2

The projector described in Note 1, wherein
the polarizing separation element and the reflection element respectively have plate shapes, and
the polarizing separation element and the reflection element are disposed to be separated from each other.

With this configuration, since the polarizing separation element and the reflection element have the plate shapes, it is possible to achieve a further reduction in weight compared with when the polarizing separation element and the reflection element are provided in an optical member such as a prism.

Note 3

The projector described in Note 1 or Note 2, wherein the polarizing separator further includes a light transmissive member configured to hold the polarizing separation element and the reflection element.

With this configuration, since the polarizing separation element and the reflection element are stably held by the light transmissive member, it is possible to stabilize a positional relation between the polarizing separation element and the reflection element even in, for example, vibration at the time when the projector is used.

Note 4

The projector described in any one of Note 1 to Note 3, wherein the phase difference element is configured by a half wave plate and provided in an optical path of the third light reflected by the reflection element.

With this configuration, since the third light reflected by the reflection element is transmitted through the half wave plate, it is possible to align the polarization direction of the third light with the first linearly polarized light component, which is the polarization direction of the second light.

Note 5

The projector described in any one of Note 1 to Note 3, wherein the phase difference element is configured by a half wave plate and provided in an optical path of the second light reflected by the polarizing separation element.

With this configuration, since the second light reflected by the polarizing separation element is transmitted through the half wave plate, it is possible to align the polarization direction of the second light with the second linearly polarized light component, which is the polarization direction of the third light.

Note 6

The projector described in any one of Note 1 to Note 3, wherein
the polarizing separation element includes a light incident surface on which the first light is made incident, and
the phase difference element is configured by a half wave plate and provided on the light incident surface of the polarizing separation element.

With this configuration, since the second light reflected by the light incident surface of the polarizing separation element is transmitted through the half wave plate, it is possible to align the polarization direction of the second light with the second linearly polarized light component, which is the polarization direction of the third light.

Note 7

The projector described in any one of Note 1 to Note 3, wherein
the reflection element includes a light reflection surface that reflects the third light, and
the phase difference element is configured by a quarter wave plate and provided on the light reflection surface of the reflection element.

With this configuration, since the third light reflected by the reflection element is transmitted through the quarter wave plate twice, it is possible to align the polarization direction of the third light with the first linearly polarized light component, which is the polarization direction of the second light.

Note 8

The projector described in any one of Note 1 to Note 3, wherein
- the polarizing separation element includes a light incident surface on which the first light is made incident and a light emission surface from which the third light is emitted, and
- the phase difference element is configured by a half wave plate and provided on the light emission surface of the polarizing separation element.

With this configuration, since the third light transmitted through the polarizing separation element and emitted from the light emission surface is transmitted through the half wave plate, it is possible to align the polarization direction of the third light with the first linearly polarized light component, which is the polarization direction of the second light.

Note 9

The projector described in any one of Note 1 to Note 8, wherein
- the polarizing separation element includes a light incident surface on which the first light is made incident,
- the reflection element includes a light reflection surface that reflects the third light and is parallel to the light incident surface, and
- an angle formed by the light incident surface and the light reflection surface and the principal ray of the first light is 45°.

With this configuration, it is possible to generate converted light including parallel light beams, polarization directions of which are aligned by collimating the second light transmitted through the polarizing separation element and the third light reflected by the reflection element.

Note 10

The projector described in any one of Note 1 to Note 9, further including: a projection optical system configured to project image light modulated by the light modulation device; and a mirror configured to bend an optical path of the image light emitted from the light modulation device and make the image light incident on the projection optical system.

With this configuration, it is possible to adopt a layout in which the polarization conversion unit, the light modulation device, and the projection optical system are prevented by the mirror from being disposed side by side on a straight line. Therefore, it is possible to reduce a dimension in a direction extending along a reference axis on which the polarization conversion unit, the light modulation device, and the mirror are disposed side by side in the projector.

Note 11

The projector described in Note 10, wherein a first direction extending along the principal ray of the first light made incident on the polarizing separator and a second direction extending along a principal ray of the image light emitted from the mirror toward the projection optical system are opposite directions.

With this configuration, since the light source and the projection optical system are disposed on the same side with respect to the reference axis, it is also possible to reduce a dimension in a direction crossing the reference axis compared with when the light source and the projection optical system are disposed on opposite sides with respect to the reference axis.

Note 12

The projector described in Note 10 or Note 11, further including an exterior housing configured to house the light source, the polarization conversion unit, the light modulation device, and the superimposing optical system and including a wall for installation on which a component for installation is provided, wherein
- a direction in which the polarization conversion unit, the superimposing optical system, the light modulation device, and the mirror are disposed side by side is a direction extending along an inner surface of the wall for installation and crossing an optical axis of the projection optical system.

With this configuration, it is possible to reduce a dimension of the projector in the direction crossing the optical axis of the projection optical system.

Note 13

The projector described in Note 10 or Note 11, further including an exterior housing configured to house the light source, the polarization conversion unit, the light modulation device, and the superimposing optical system and including a wall for installation on which a component for installation is provided, wherein
- a direction in which the polarization conversion unit, the superimposing optical system, the light modulation device, and the mirror are disposed side by side is a direction orthogonal to an inner surface of the wall for installation.

With this configuration, it is possible to reduce a dimension in a height direction of the projector orthogonal to the inner surface of the wall for installation.

Note 14

The projector described in any one of Note 1 to Note 13, further including a collimating optical system provided between the superimposing optical system and the light modulation device and configured to collimate light emitted from the superimposing optical system, wherein
- the collimating optical system is configured by a Fresnel lens.

With this configuration, it is possible to reduce a dimension in an axial direction of the projector by reducing thickness in an optical axis direction of the collimating optical system.

Note 15

The projector described in any one of Note 1 to Note 14, wherein
- the superimposing optical system includes: a first lens section on which the second light emitted from the polarization conversion unit is made incident; and a second lens section on which the third light emitted from the polarization conversion unit is made incident, and
- a principal ray of the second light emitted from the first lens section and a principal ray of the third light emitted from the second lens section come closer to each other toward the light modulation device.

With this configuration, the second light and the third light can be superimposed in a light irradiation region (an image forming region) of the light modulation device. Accordingly, since the superimposing optical system can uniformize, by superimposing the second light and the third light, an in-plane brightness distribution of converted light that illuminates the liquid crystal panel, the liquid crystal panel can generate an excellent image without brightness unevenness in a plane.

Note 16

The projector described in any one of Note 1 to Note 15, wherein the superimposing optical system is configured by a Fresnel lens.

With this configuration, since the superimposing optical system is configured by a Fresnel lens, it is possible to reduce a dimension in an optical axis direction of the projector.

Note 17

The projector described in any one of Note 1 to Note 16, wherein the liquid crystal panel includes a color filter.

With this configuration, it is possible to project a full-color image.

Note 18

The projector described in Note 17, wherein the first light emitted from the light source is white light.

With this configuration, it is possible to generate a full-color image by combining the projector with the liquid crystal panel including the color filter.

What is claimed is:

1. A projector comprising:
   a light source configured to emit first light, which is non-linearly polarized light;
   a polarization conversion unit configured to convert the first light made incident from the light source into predetermined linearly polarized light;
   a light modulation device including a liquid crystal panel which modulates the predetermined linearly polarized light converted by the polarization conversion unit; and
   a superimposing optical system configured to superimpose, on the liquid crystal panel, the predetermined linearly polarized light made incident from the polarization conversion unit, wherein
   the polarization conversion unit includes:
      a polarizing separator configured to separate the first light into second light and third light based on polarized light components; and
      a phase difference element configured to align polarization directions of the second light and the third light with the predetermined linearly polarized light,
   the polarizing separator includes a polarizing separation element and a reflection element,
   the polarizing separation element is provided in a tilted state with respect to a principal ray of the first light and separates the first light by reflecting a first linearly polarized light component in the first light toward the superimposing optical system as the second light and transmitting, as the third light, a second linearly polarized light component in a polarization direction different from a polarization direction of the first linearly polarized light component in the first light, and
   the reflection element reflects the third light made incident from the polarizing separation element toward the superimposing optical system.

2. The projector according to claim 1, wherein
   the polarizing separation element and the reflection element respectively have plate shapes, and
   the polarizing separation element and the reflection element are disposed to be separated from each other.

3. The projector according to claim 1, wherein the polarizing separator further includes a light transmissive member configured to hold the polarizing separation element and the reflection element.

4. The projector according to claim 1, wherein the phase difference element is configured by a half wave plate and provided in an optical path of the third light reflected by the reflection element.

5. The projector according to claim 1, wherein the phase difference element is configured by a half wave plate and provided in an optical path of the second light reflected by the polarizing separation element.

6. The projector according to claim 1, wherein
   the polarizing separation element includes a light incident surface on which the first light is made incident, and
   the phase difference element is configured by a half wave plate and provided on the light incident surface of the polarizing separation element.

7. The projector according to claim 1, wherein
   the reflection element includes a light reflection surface that reflects the third light, and
   the phase difference element is configured by a quarter wave plate and provided on the light reflection surface of the reflection element.

8. The projector according to claim 1, wherein
   the polarizing separation element includes a light incident surface on which the first light is made incident and a light emission surface from which the third light is emitted, and
   the phase difference element is configured by a half wave plate and provided on the light emission surface of the polarizing separation element.

9. The projector according to claim 1, wherein
   the polarizing separation element includes a light incident surface on which the first light is made incident,
   the reflection element includes a light reflection surface that reflects the third light and is parallel to the light incident surface, and
   an angle formed by the light incident surface and the light reflection surface and the principal ray of the first light is 45°.

10. The projector according to claim 1, further comprising:
    a projection optical system configured to project image light modulated by the light modulation device; and
    a mirror configured to bend an optical path of the image light emitted from the light modulation device and make the image light incident on the projection optical system.

11. The projector according to claim 10, wherein a first direction extending along the principal ray of the first light made incident on the polarizing separator and a second direction extending along a principal ray of the image light emitted from the mirror toward the projection optical system are opposite directions.

12. The projector according to claim 10, further comprising an exterior housing configured to house the light source, the polarization conversion unit, the light modulation device, and the superimposing optical system and including a wall for installation on which a component for installation is provided, wherein
    a direction in which the polarization conversion unit, the superimposing optical system, the light modulation device, and the mirror are disposed side by side is a direction extending along an inner surface of the wall for installation and crossing an optical axis of the projection optical system.

13. The projector according to claim 10, further comprising an exterior housing configured to house the light source, the polarization conversion unit, the light modulation device, and the superimposing optical system and including a wall for installation on which a component for installation is provided, wherein
    a direction in which the polarization conversion unit, the superimposing optical system, the light modulation device, and the mirror are disposed side by side is a direction orthogonal to an inner surface of the wall for installation.

14. The projector according to claim 1, further comprising a collimating optical system provided between the superimposing optical system and the light modulation device and configured to collimate light emitted from the superimposing optical system, wherein
the collimating optical system is configured by a Fresnel lens.

15. The projector according to claim 1, wherein
the superimposing optical system includes:
a first lens section on which the second light emitted from the polarization conversion unit is made incident; and
a second lens section on which the third light emitted from the polarization conversion unit is made incident, and
a principal ray of the second light emitted from the first lens section and a principal ray of the third light emitted from the second lens section come closer to each other toward the light modulation device.

16. The projector according to claim 1, wherein the superimposing optical system is configured by a Fresnel lens.

17. The projector according to claim 1, wherein the liquid crystal panel includes a color filter.

18. The projector according to claim 16, wherein the first light emitted from the light source is white light.

* * * * *